(12) United States Patent
Kimura et al.

(10) Patent No.: US 11,307,174 B2
(45) Date of Patent: Apr. 19, 2022

(54) ULTRASONIC FLAW DETECTION DEVICE

(71) Applicant: Mitsubishi Electric Corporation, Tokyo (JP)

(72) Inventors: Tomonori Kimura, Tokyo (JP);
Tomonobu Gotou, Kamakura (JP);
Yoshiaki Kunii, Kamakura (JP);
Hisashi Udagawa, Kamakura (JP);
Akira Hosoya, Kamakura (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 137 days.

(21) Appl. No.: 16/757,685

(22) PCT Filed: Dec. 7, 2017

(86) PCT No.: PCT/JP2017/044038
§ 371 (c)(1),
(2) Date: Apr. 20, 2020

(87) PCT Pub. No.: WO2019/111381
PCT Pub. Date: Jun. 13, 2019

(65) Prior Publication Data
US 2020/0249205 A1   Aug. 6, 2020

(51) Int. Cl.
*G01N 29/24* (2006.01)
*G01N 29/26* (2006.01)
(Continued)

(52) U.S. Cl.
CPC ............ *G01N 29/07* (2013.01); *G01N 29/24* (2013.01); *G01N 29/26* (2013.01); *G01N 29/44* (2013.01);
(Continued)

(58) Field of Classification Search
CPC ................ G01N 29/24; G01N 29/221; G01N 29/4472; G01N 29/262; G01N 29/48;
(Continued)

(56) References Cited

U.S. PATENT DOCUMENTS 4,294,118 A * 10/1981 Shiraiwa ............... B82Y 15/00
73/620
4,435,984 A    3/1984 Gruber
(Continued)

FOREIGN PATENT DOCUMENTS

DE      3715914 A1    12/1988
JP      6-331603 A    12/1994
JP      2013-242202 A  12/2013

OTHER PUBLICATIONS

Nippon Steel & Sumitomo Metal Technical Report No. 121 Mar. 2019, Non-destructive Inspection Technique Supporting Product Quality, Toshiyuki et al., (Year: 2019).*
Extended European Search Report, dated Oct. 22, 2020, for European Application No. 17933982.5.
(Continued)

*Primary Examiner* — Jacques M Saint Surin
(74) *Attorney, Agent, or Firm* — Birch, Stewart, Kolasch & Birch, LLP

(57) ABSTRACT

An ultrasonic probe (1) sends out ultrasound waves to a steel sheet (100) obliquely at a plurality of angles, using transmission signals provided from a transmission signal processing unit (3a). In addition, the ultrasonic probe (1) receives echoes corresponding to the plurality of angles from the steel sheet (100). A reception signal processing unit (3b) determines amplitudes of the echoes received by the ultrasonic probe (1) and corresponding to the plurality of angles, and periods of time from when the ultrasound waves are sent out until the echoes are received, as reception times, and identifies a location of a flaw (101) in the steel sheet
(Continued)

(100) from the reception times and a ratio between the amplitudes.

4 Claims, 15 Drawing Sheets

(51) Int. Cl.
*G01N 29/44* (2006.01)
*G01N 29/07* (2006.01)
(52) U.S. Cl.
CPC ............... *G01N 2291/011* (2013.01); *G01N 2291/0234* (2013.01); *G01N 2291/0289* (2013.01); *G01N 2291/044* (2013.01); *G01N 2291/106* (2013.01)
(58) Field of Classification Search
CPC ........ G01N 29/26; G01N 29/07; G01N 29/44; G01N 29/11; G01N 29/2487; G01N 29/043; G01N 29/069; G01N 2291/056; G01N 2291/106; G01N 2291/0427; G01N 2291/044; G01N 2291/0289; G01N 2291/0234; G01N 2291/057; G01N 2291/011; G01N 2291/2632
USPC ........................................................... 73/579
See application file for complete search history.

(56) References Cited

U.S. PATENT DOCUMENTS

| | | | | |
|---|---|---|---|---|
| 4,497,210 | A | | 2/1985 | Uchida et al. |
| 5,335,547 | A | * | 8/1994 | Nakajima ............... G01N 29/22 |
| | | | | 702/167 |
| 5,814,731 | A | * | 9/1998 | Alexander ........... G01N 29/225 |
| | | | | 73/624 |
| 5,974,888 | A | * | 11/1999 | Bonitz ............... G01N 29/2487 |
| | | | | 73/624 |
| 5,992,235 | A | | 11/1999 | Fischer et al. |
| 6,640,632 | B1 | * | 11/2003 | Hatanaka ............. G01N 29/043 |
| | | | | 73/598 |
| 7,093,490 | B2 | * | 8/2006 | Kono ..................... G01N 29/07 |
| | | | | 73/602 |
| 9,423,380 | B2 | * | 8/2016 | Mizota ................. G01N 29/069 |

OTHER PUBLICATIONS

Jitsumori et al., "Generation of Lamb Wave Using Linear Array Probe and Its Application for Flaw Detection," Proceedings of the 6th Symposium on Ultrasonic Electronics, Tokyo, Japan, 1985, Japanese Journal of Applied Physics, vol. 25, Supplemental 25-1, Jan. 1, 1988, pp. 200-202, XP001159049.

* cited by examiner

ULTRASONIC FLAW DETECTION DEVICE

TECHNICAL FIELD

The invention relates to an ultrasonic flaw detection device that determines the properties of a specimen using ultrasound.

BACKGROUND ART

A steel sheet manufactured by a steel manufacturer, etc., may have a flaw on its front or back surface, and such a flaw is detected by an ultrasonic flaw detection device.

When steel is thin, flaw detection using a plate wave or a surface wave is performed by allowing ultrasound to obliquely enter a steel sheet by using a probe. Conventionally, as such an ultrasonic flaw detection device, there is one that detects a surface flaw using a surface wave by allowing ultrasound to obliquely enter a steel sheet from a wheel probe (see, for example, Patent Literature 1).

CITATION LIST

Patent Literatures

Patent Literature 1: JP H06-331603 A

SUMMARY OF INVENTION

Technical Problem

Meanwhile, there is a case in which an ultrasonic flaw detection device needs to grasp on which one of the front and back sides of a steel sheet a flaw is located. However, the conventional ultrasonic flaw detection device described in the above-described Patent Literature 1 has difficulty in determining on which one of the front and back a flaw is located.

The invention is made to solve such a problem, and an object of the invention is to provide an ultrasonic flaw detection device capable of determining on which one of the front and back sides of a steel sheet a flaw is located.

Solution to Problem

An ultrasonic flaw detection device according to the invention includes: an ultrasonic probe to generate ultrasound waves corresponding to transmission signals to be provided to the ultrasonic probe, and send out the ultrasound waves into a specimen, and receive echoes of the respective ultrasound waves having propagated through the specimen and output the received echoes as reception signals; a processor to execute a program; and a memory to store the program, when executed by the processor, perform processes of, generating, as the transmission signals, signals that are used by the ultrasonic probe to send out the ultrasound waves to the specimen obliquely at a respective plurality of angles; and determining, from the reception signals, amplitudes of the echoes corresponding to the plurality of angles, and periods of time from when the respective ultrasound waves are sent out until the respective echoes are received, as reception times, and identifying a location of an acoustic discontinuous portion in the specimen from the reception times and a ratio between the amplitudes.

Advantageous Effects of Invention

The ultrasonic flaw detection device according to the invention sends out ultrasound waves to a specimen obliquely at a respective plurality of angles, determines amplitudes and reception times of echoes corresponding to the plurality of angles, and identifies a location of an acoustic discontinuous portion in the specimen from the reception times and a ratio between the amplitudes. By this, it can be determined on which one of the front and back sides of the specimen a flaw is located.

DESCRIPTION OF EMBODIMENTS

To describe the invention in more detail, a mode for carrying out the invention will be described below with reference to the accompanying drawings.

First Embodiment

Figure 1:
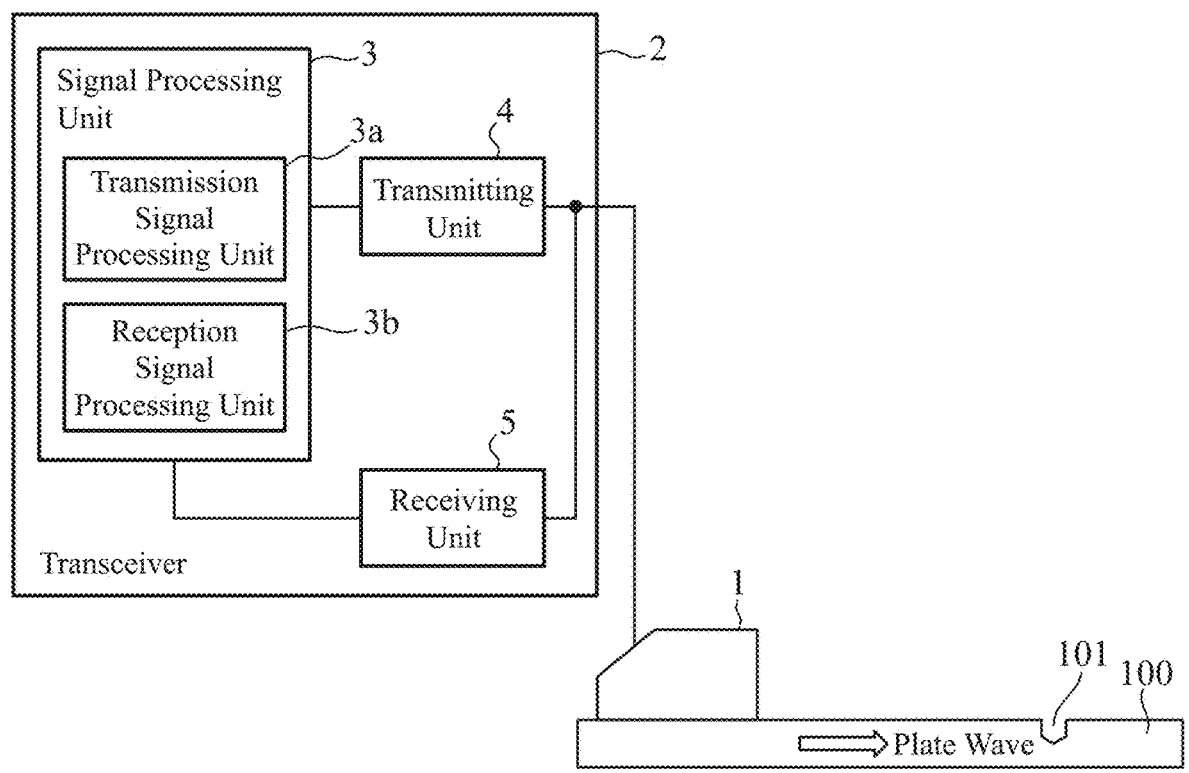
FIG. 1 is a configuration diagram of an ultrasonic flaw detection device of a first embodiment of the invention.

FIG. 1 is a configuration diagram of an ultrasonic flaw detection device of the present embodiment.

Figure 2:
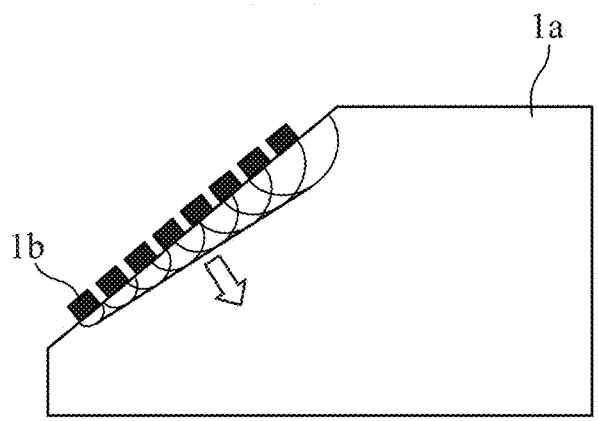
FIG. 2 is a configuration diagram of an ultrasonic probe of the ultrasonic flaw detection device of the first embodiment of the invention.

The ultrasonic flaw detection device shown in the drawing includes an ultrasonic probe 1 and a transceiver 2. The ultrasonic probe 1 is an angle probe, and has a function of transmitting ultrasound waves which are driven by transmission signals to be provided thereto into a steel sheet 100 which is a specimen, and receiving echoes of the ultrasound waves having propagated through the steel sheet 100 and outputting the echoes as reception signals. The details of the ultrasonic probe 1 are shown in FIG. 2. As shown in FIG. 2, the ultrasonic probe 1 includes a wedge 1a and a transducer 1b. The transducer 1b is formed by arraying a plurality of transducer elements.

The transceiver 2 has a function of providing transmission signals to the ultrasonic probe 1, and performing signal processing on reception signals which are echoes obtained by the ultrasonic probe 1, and includes a signal processing unit 3, a transmitting unit 4, and a receiving unit 5. The signal processing unit 3 includes a transmission signal processing unit 3a and a reception signal processing unit 3b. The transmission signal processing unit 3a has a function of generating, as transmission signals, signals that are used by the ultrasonic probe 1 to send out ultrasound waves to the steel sheet 100 obliquely at a plurality of angles, and providing the transmission signals to the transmitting unit 4. The reception signal processing unit 3b has a function of receiving, through the receiving unit 5, reception signals obtained by the ultrasonic probe 1, determining, from the reception signals, amplitudes and reception times of ultrasonic echoes corresponding to the plurality of angles, and identifying a location of an acoustic discontinuous portion in the steel sheet 100 from the reception times and a ratio between the amplitudes. The transmitting unit 4 has a function of generating signals for driving the transducer 1b of the ultrasonic probe 1, on the basis of the transmission signals provided from the transmission signal processing unit 3a. The receiving unit 5 has a function of amplifying the reception signals from the ultrasonic probe 1, as necessary, and transmitting the reception signals to the reception signal processing unit 3b in the signal processing unit 3.

Figure 3:
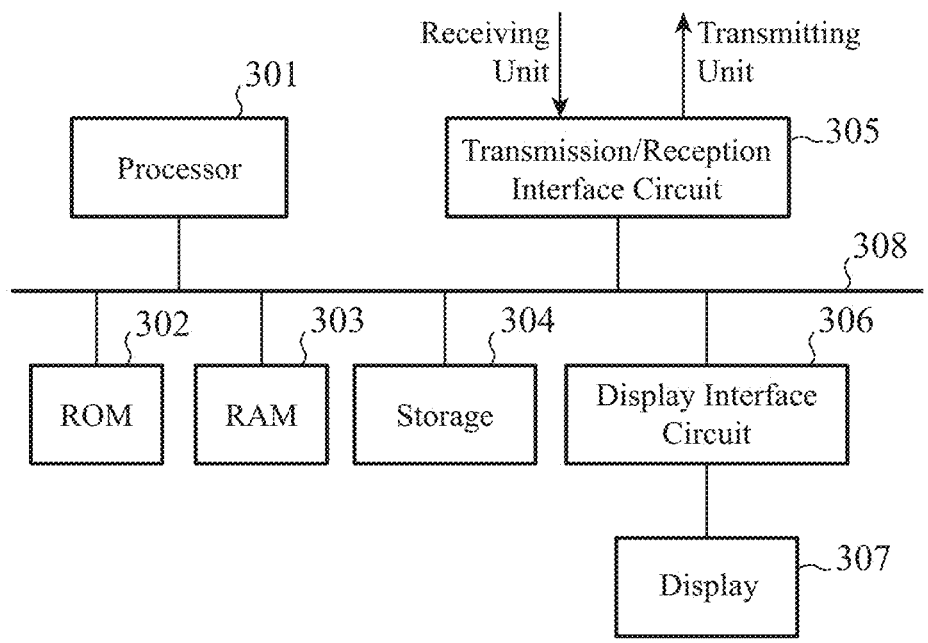
FIG. 3 is a hardware configuration diagram of the ultrasonic flaw detection device of the first embodiment of the invention.

FIG. 3 is a block diagram schematically showing an exemplary hardware configuration of the signal processing unit 3. In an example of FIG. 3, the signal processing unit 3 includes a processor 301 including a CPU, a read only memory (ROM) 302, a random access memory (RAM) 303, a storage 304, a transmission/reception interface circuit 305, a display interface circuit 306, and a display 307. The processor 301, the ROM 302, the RAM 303, the storage 304, the transmission/reception interface circuit 305, the display interface circuit 306, and the display 307 are mutually connected through a signal path 308 such as a bus circuit.

The processor 301 uses the RAM 303 as a working memory, and executes an ultrasonic measurement program read from the ROM 302 or the storage 304, and thereby implements the functions of the transmission signal processing unit 3a and the reception signal processing unit 3b. The storage 304 is a storage unit that is formed using, for example, a volatile memory such as a synchronous DRAM (SDRAM), a hard disk drive (HDD), or a solid-state drive (SSD), and that stores programs corresponding to the functions of the transmission signal processing unit 3a and the reception signal processing unit 3b, and stores processing results. The transmission/reception interface circuit 305 is an interface circuit used for signal transmission with the transmitting unit 4 and signal transmission with the receiving unit 5. The display interface circuit 306 is an interface circuit used for signal transmission with the display 307.

The display 307 displays a result of determination of a flaw location. The result may be displayed as characters, or may be displayed using an LED lamp. A display method is not limited thereto.

Figure 4:
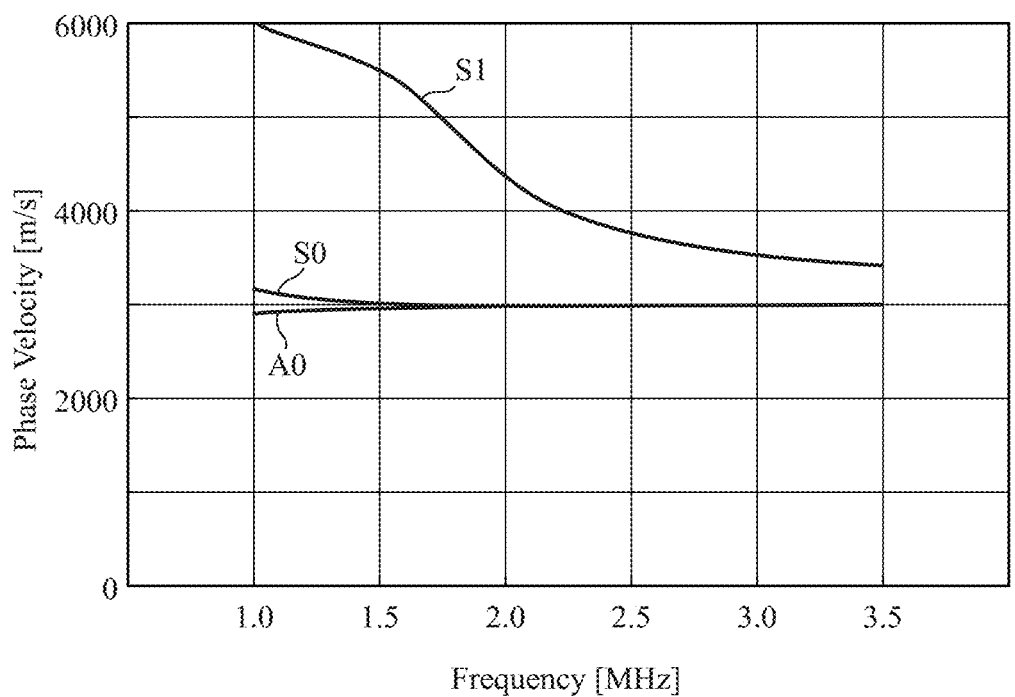
FIG. 4 is an illustrative diagram showing the phase velocities of plate waves in the ultrasonic flaw detection device of the first embodiment of the invention.
Figure 5:
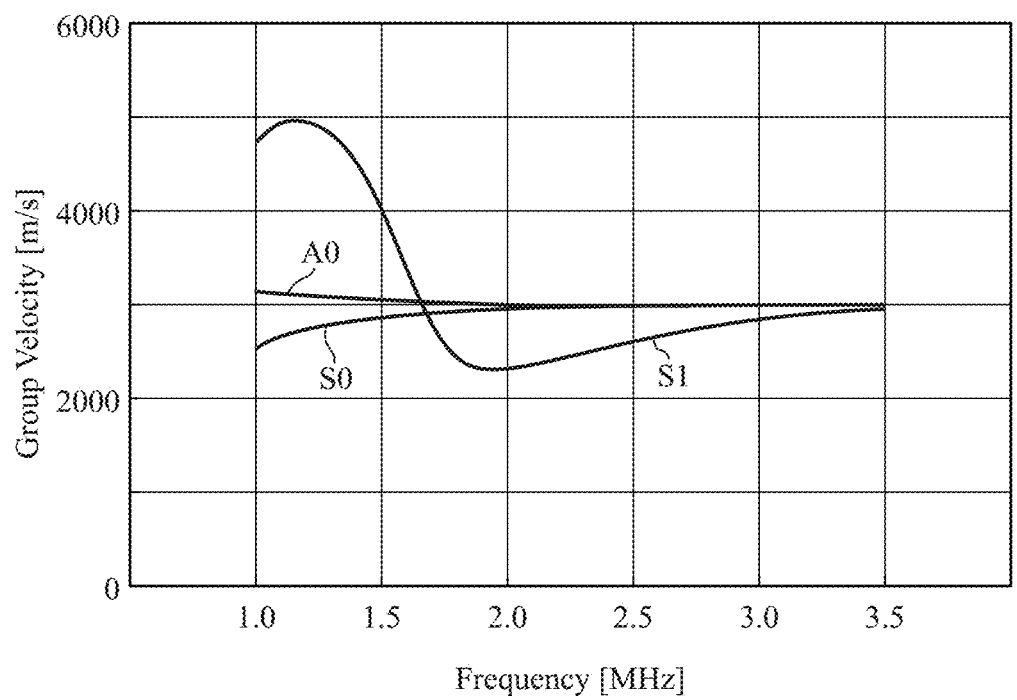
FIG. 5 is an illustrative diagram showing the group velocities of the plate waves in the ultrasonic flaw detection device of the first embodiment of the invention.

Next, the operation of the ultrasonic flaw detection device of the present embodiment will be described. First, plate waves that propagate through a steel sheet will be described with reference to FIGS. 4 and 5. FIGS. 4 and 5 respectively show the phase velocities and group velocities of plate waves that propagate through a steel sheet with a thickness of 3.6 mm. As is clear from these drawings, the phase velocity and the group velocity vary depending on the frequency. Note that although many modes propagate in practice, here, three modes, A0, S0, and S1, are shown. Here, as an example, plate waves that propagate through a steel sheet with a thickness of 3.6 mm at a frequency of 2.25 MHz will be described.

As shown in FIG. 4, when the frequency is 2.25 MHz, the phase velocities of A0 and S0 are both about 3000 m/s, and are almost identical. Therefore, it is conceivable that by setting the angle of incidence of the ultrasonic probe 1 in such a manner that a plate wave with a phase velocity of 3000 m/s propagates, a mode having both characteristics of A0 and S0 propagates. In the present embodiment, this mode is called an "A0S0 mode". On the other hand, the phase velocity of S1 is about 4000 m/s. By setting the angle of incidence of the ultrasonic probe 1 in such a manner that a plate wave with a phase velocity of 4000 m/s propagates, a plate wave in S1 mode propagates.

Figure 6A:
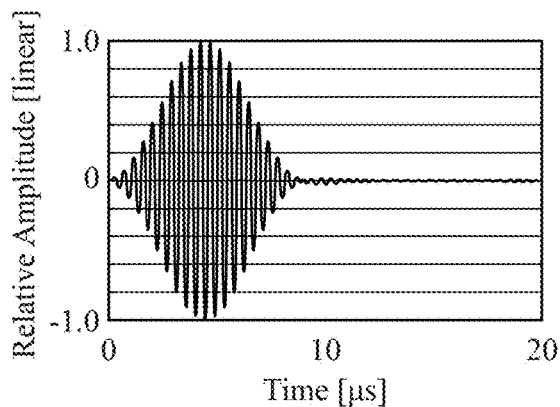
FIGS. 6A to 6E are illustrative diagrams of simulation conditions for the ultrasonic flaw detection device of the first embodiment of the invention.
Figure 6B:
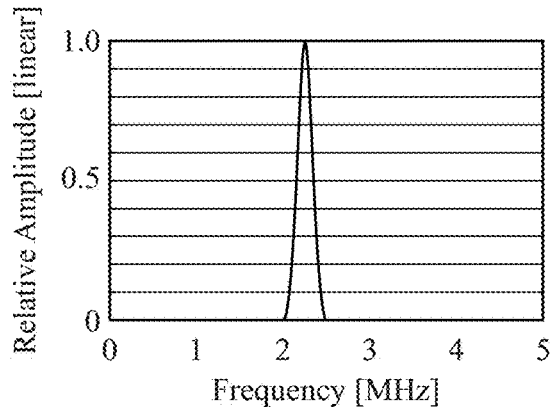
Figure 6C:
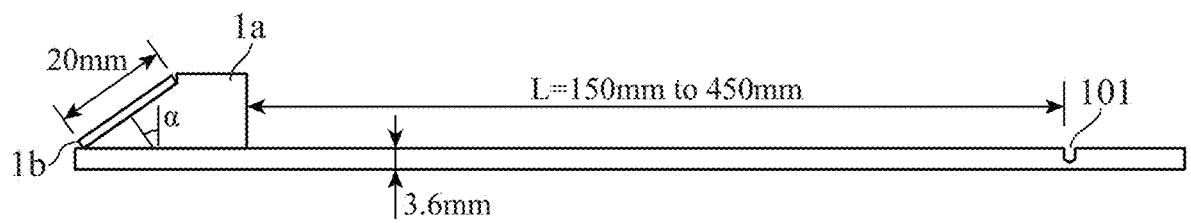
Figure 6D:
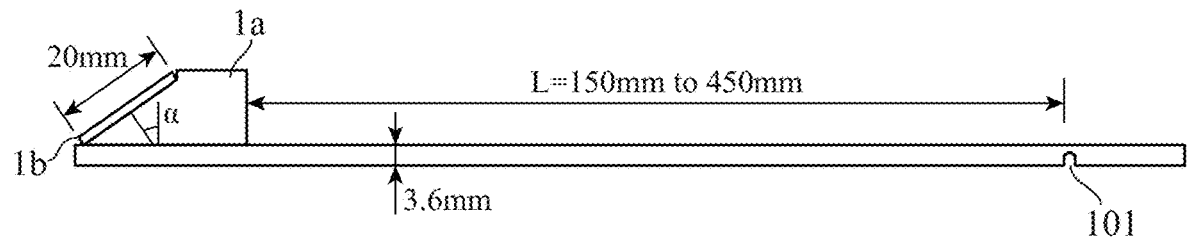
Figure 6E:
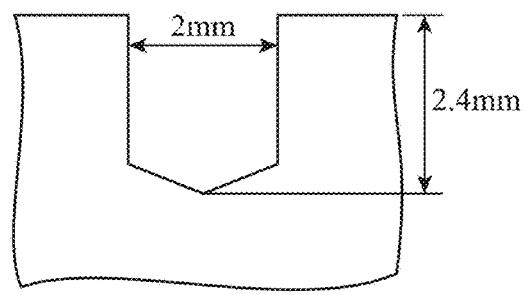
Figure 7A:
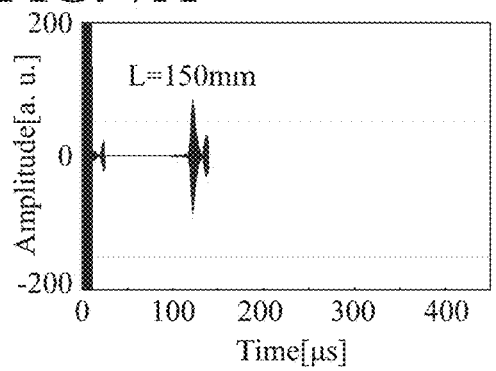
FIGS. 7A to 7G are illustrative diagrams showing echoes obtained when a flaw present on a front side of a steel sheet is detected with the angle of incidence set to 34.5° in the ultrasonic flaw detection device of the first embodiment of the invention.
Figure 7B:
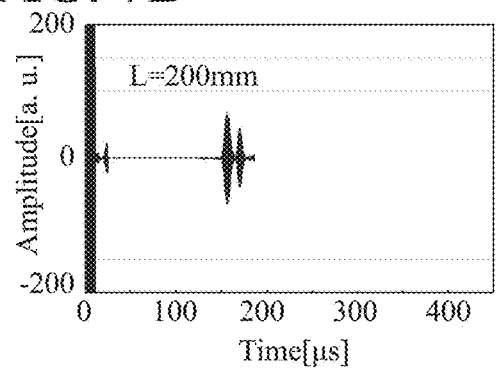
Figure 7C:
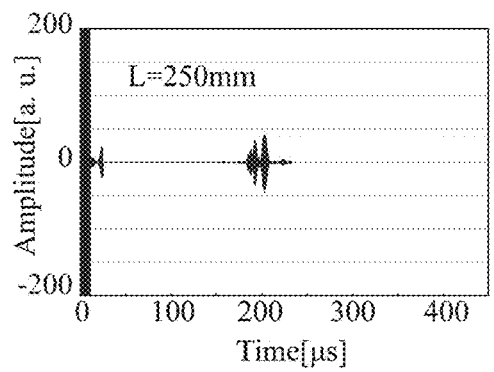
Figure 7D:
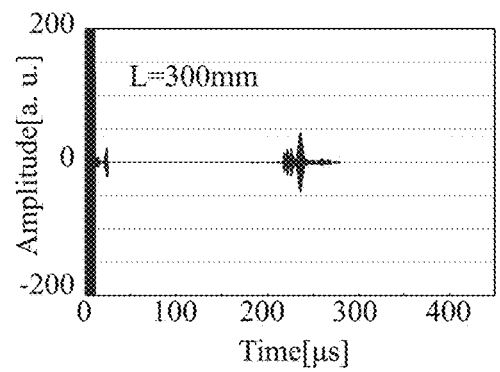
Figure 7E:
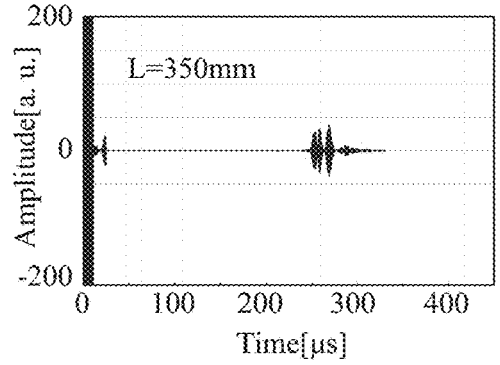
Figure 7F:
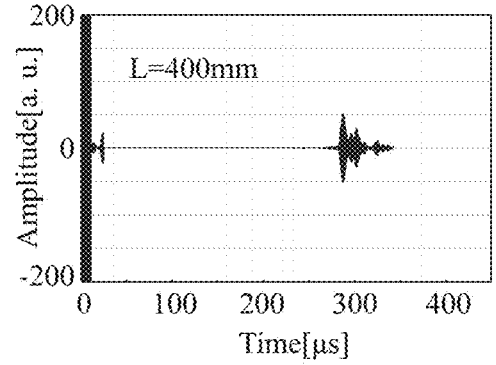
Figure 7G:
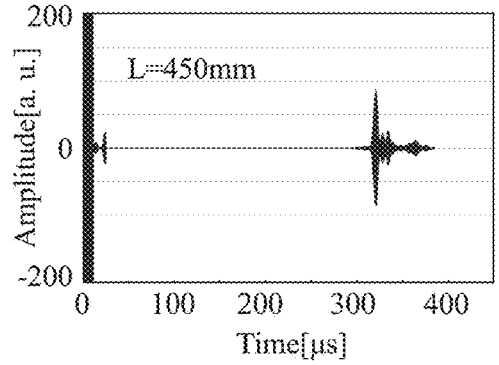
Figure 8A:
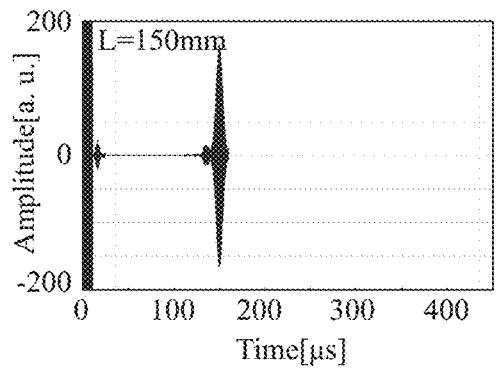
FIGS. 8A to 8G are illustrative diagrams showing echoes obtained when the flaw present on the front side of the steel sheet is detected with the angle of incidence set to 24.6° in the ultrasonic flaw detection device of the first embodiment of the invention.
Figure 8B:
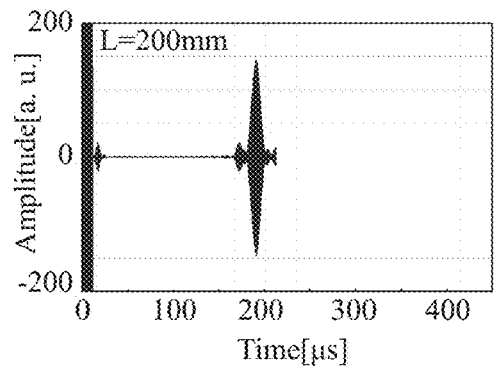
Figure 8C:
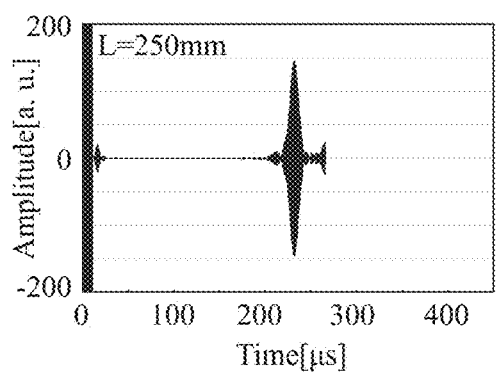
Figure 8D:
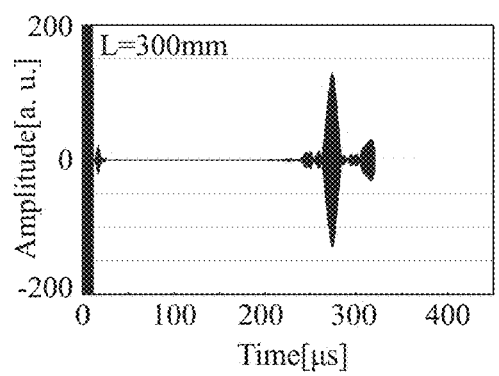
Figure 8E:
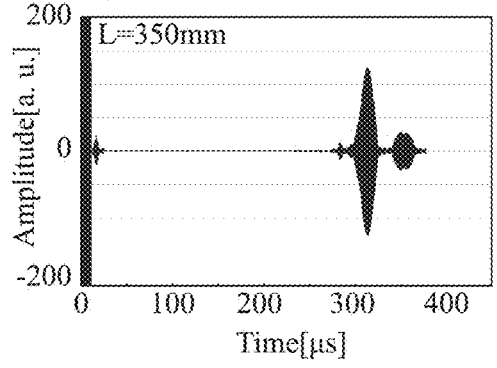
Figure 8F:
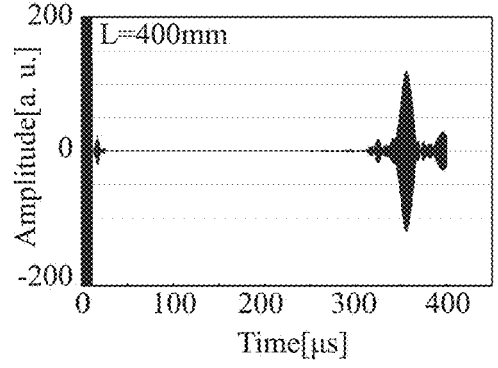
Figure 8G:
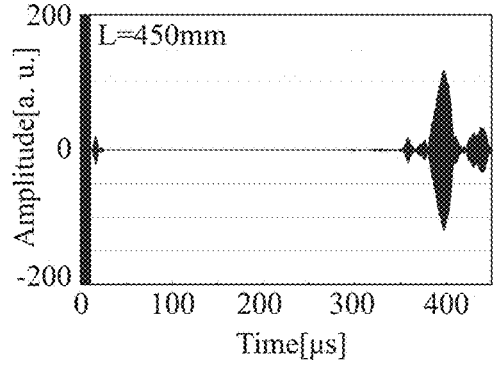

A simulation is performed to examine what echoes are to be received when a flaw 101 of the steel sheet 100 is detected by propagation of plate waves in A0S0 mode and S1 mode. FIG. 6 shows simulation conditions. FIGS. 6A and 6B show response characteristics of the ultrasonic probe 1 used in the simulation, and FIG. 6A shows a relationship between time and relative amplitude, and FIG. 6B shows a relationship between frequency and relative amplitude. In this example, as shown in FIG. 6B, a narrow band with a center frequency of 2.25 MHz is used. FIGS. 6C and 6D are diagrams respectively showing, at a time when the flaw 101 is present on the front and back sides of the steel sheet 100, relative positional relationships between the ultrasonic probe 1 and the steel sheet 100. As shown in FIGS. 6C and 6D, echoes from the flaw 101 are obtained with a distance L from the ultrasonic probe 1 to the flaw 101 changed from 150 mm to 450 mm. FIG. 6E shows a shape of the flaw. FIG. 6E shows the flaw 101 present on the front side of the steel sheet 100, and when the flaw 101 is present on the back side, the flaw shape is vertically reversed.

In the simulation, an angle probe is formed by allowing the transducer 1b to contact with a liquid with a sound velocity of 1680 m/s, and using the liquid as the wedge 1a. In this case, the angle of incidence for generating an A0S0 mode with a phase velocity of 3000 m/s is $$\sin^{-1}\left(\frac{1680}{3000}\right) = 34.1°$$

by Snell's law. Here, for the convenience of the simulation, the angle of incidence for allowing the A0S0 mode to propagate is set to 34.5°. On the other hand, the angle of incidence for generating an S1 mode with a phase velocity of 4000 m/s is $$\sin^{-1}\left(\frac{1680}{4000}\right) = 24.8°$$

Here, for the convenience of the simulation, the angle of incidence for allowing the S1 mode to propagate is set to 24.6°.

FIGS. 7A to 7G show echoes obtained when the flaw 101 present on the front side of the steel sheet 100 is detected by allowing the A0S0 mode to propagate at an angle of incidence of 34.5°. FIGS. 7A to 7G show examples of a distance of 150 mm to 450 mm, respectively. As shown in the drawings, the echo height decreases with the distance up to a distance of about 350 mm, but the echo height exhibits an increasing tendency at a distance of 400 mm and more.

FIG. 8 shows echoes obtained when the flaw present on the front side of the steel sheet 100 is detected by allowing the S1 mode to propagate at an angle of incidence of 24.6°. FIGS. 8A to 8G show examples of a distance of 150 mm to 450 mm, respectively. As shown in the drawings, the echo height gradually decreases with the distance.

Figure 9:
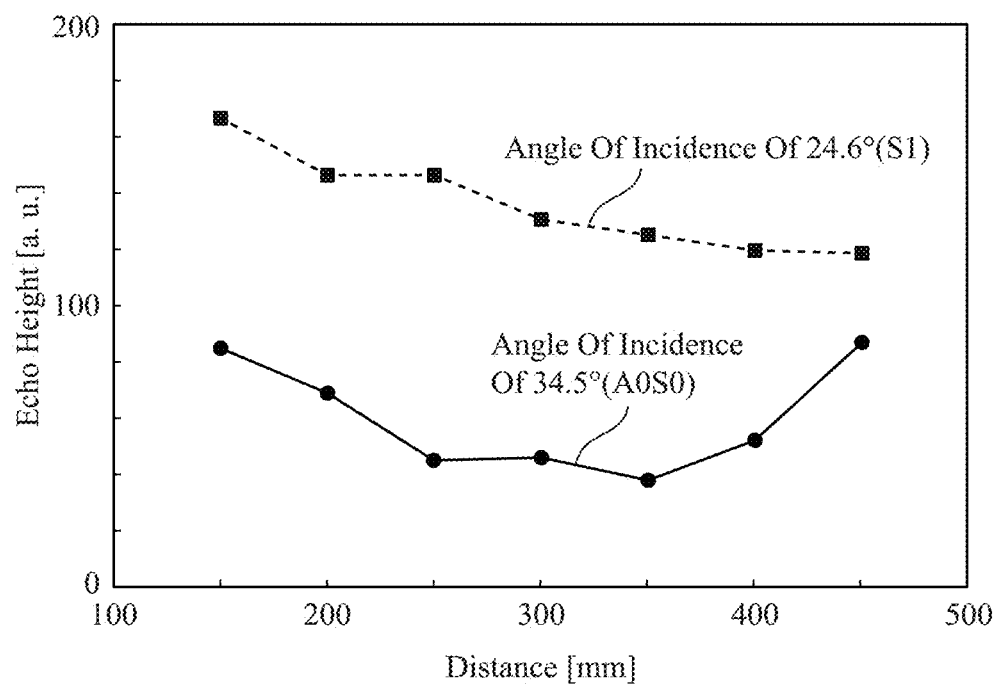
FIG. 9 is an illustrative diagram showing changes in echo height relative to distance at a time when the flaw is present on the front side of the steel sheet in the ultrasonic flaw detection device of the first embodiment of the invention.
Figure 10A:
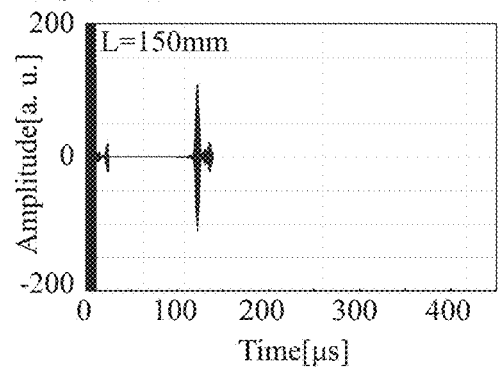
FIGS. 10A to 10G are illustrative diagrams showing echoes obtained when a flaw present on a back side of the steel sheet is detected with the angle of incidence set to 34.5° in the ultrasonic flaw detection device of the first embodiment of the invention.
Figure 10B:
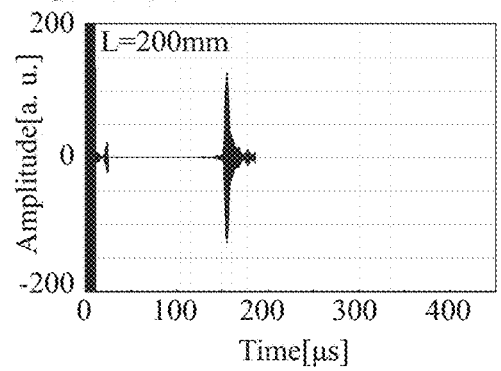
Figure 10C:
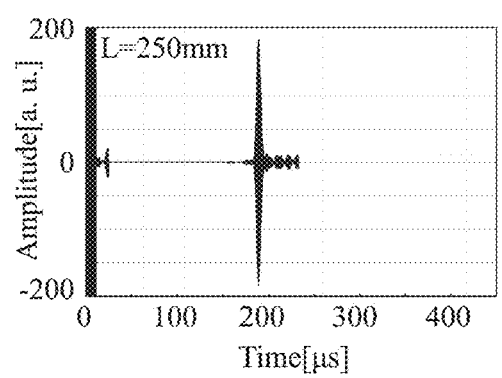
Figure 10D:
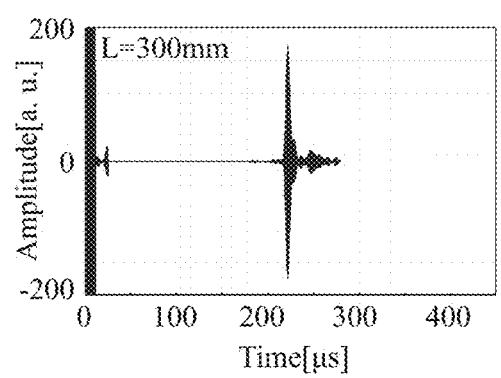
Figure 10E:
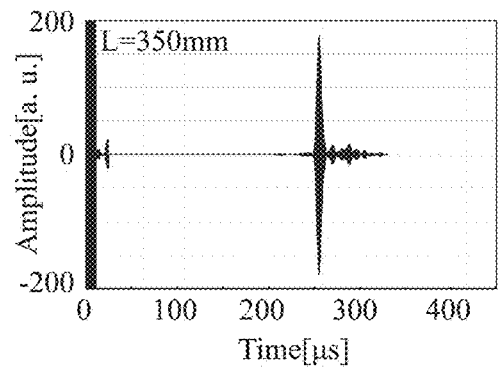
Figure 10F:
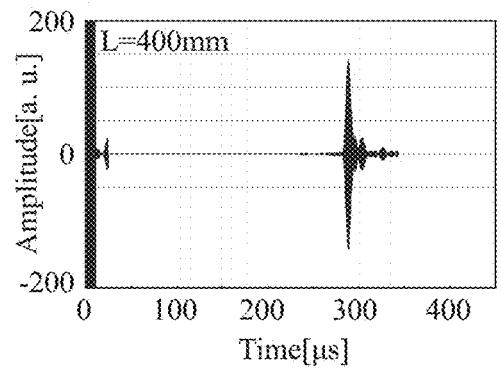
Figure 10G:
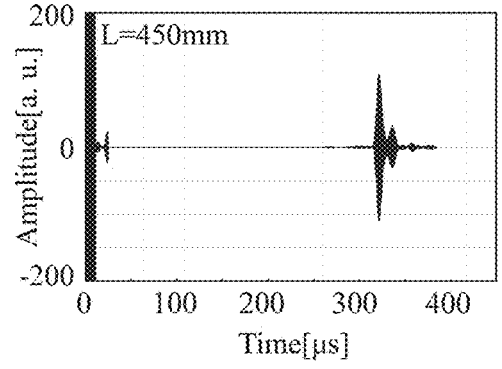
Figure 11A:
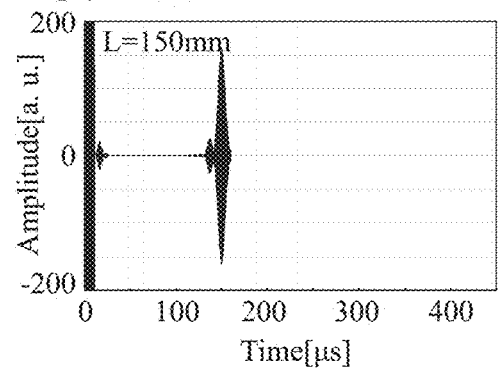
FIGS. 11A to 11G are illustrative diagrams showing echoes obtained when the flaw present on the back side of the steel sheet is detected with the angle of incidence set to 24.6° in the ultrasonic flaw detection device of the first embodiment of the invention.
Figure 11B:
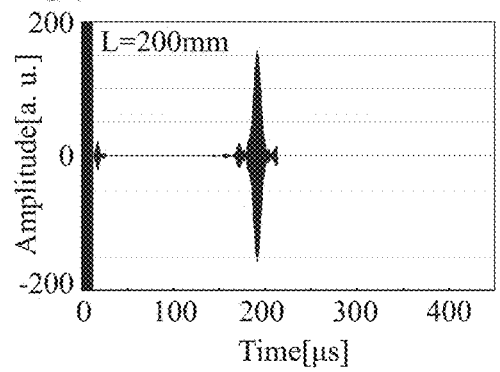
Figure 11C:
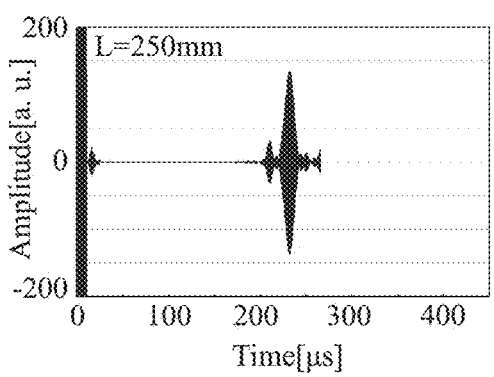
Figure 11D:
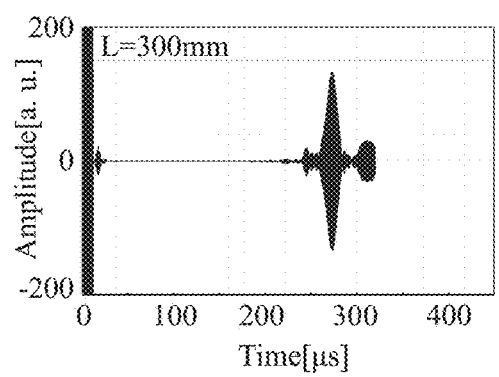
Figure 11E:
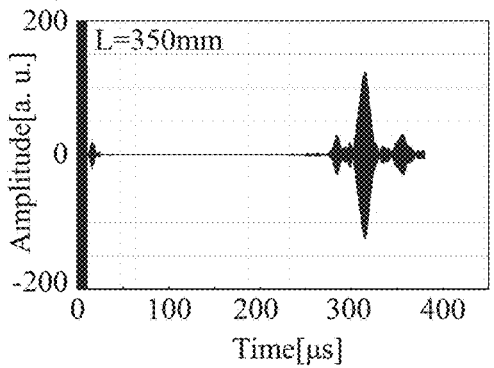
Figure 11F:
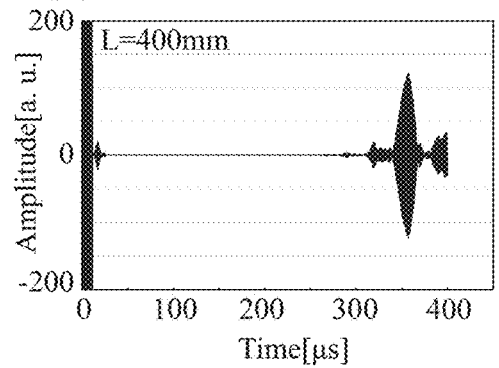
Figure 11G:
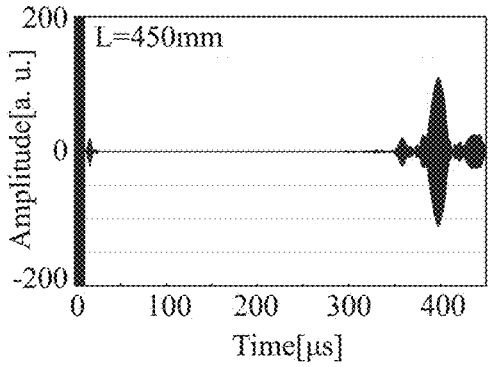

FIG. 9 shows changes in echo height relative to the distance at a time when the flaw 101 is present on the front side of the steel sheet 100. As shown in the drawing, the echo height of the S1 mode generated at an angle of incidence of 24.6° gradually decreases with the distance, whereas the echo height of the A0S0 mode generated at an angle of incidence of 34.5° exhibits a complex characteristic in which the echo height decreases and then increases.

FIG. 10 shows echoes obtained when the flaw 101 present on the back side of the steel sheet 100 is detected by allowing the A0S0 mode to propagate at an angle of incidence of 34.5°. FIGS. 10A to 10G show examples of a distance of 150 mm to 450 mm, respectively. As shown in the drawings, the echo height increases with the distance, but decreases with the distance after the distance exceeds 350 mm. This is a reverse tendency to that at a time when the flaw 101 is present on the front side.

FIG. 11 shows echoes obtained when the flaw 101 present on the back side of the steel sheet 100 is detected by allowing the S1 mode to propagate at an angle of incidence of 24.6°. FIGS. 11A to 11G show examples of a distance of 150 mm to 450 mm, respectively. As shown in the drawings, the echo height gradually decreases with the distance. This is the same tendency as that at a time when the flaw 101 is present on the front side.

Figure 12:
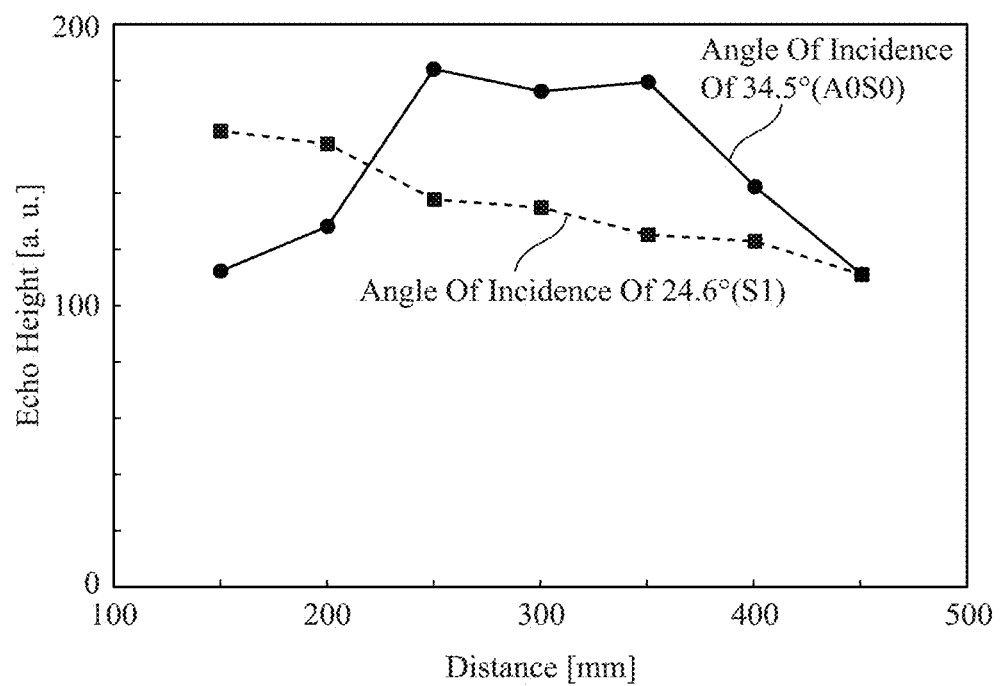
FIG. 12 is an illustrative diagram showing changes in echo height relative to distance at a time when the flaw is present on the back side of the steel sheet in the ultrasonic flaw detection device of the first embodiment of the invention.

FIG. 12 shows changes in echo height relative to the distance at a time when the flaw 101 is present on the back side of the steel sheet 100. As shown in the drawing, the echo height of the S1 mode generated at an angle of incidence of 24.6° gradually decreases with the distance, whereas the echo height of the A0S0 mode generated at an angle of incidence of 34.5° exhibits a complex characteristic in which the echo height increases and then decreases.

Figure 13:
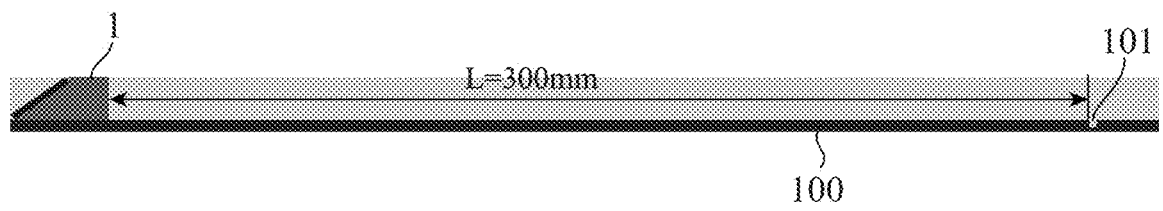
FIG. 13 is an illustrative diagram showing results of sound field simulation obtained when an A0S0 mode propagates at an angle of incidence of 34.5° in the ultrasonic flaw detection device of the first embodiment of the invention.
Figure 13:
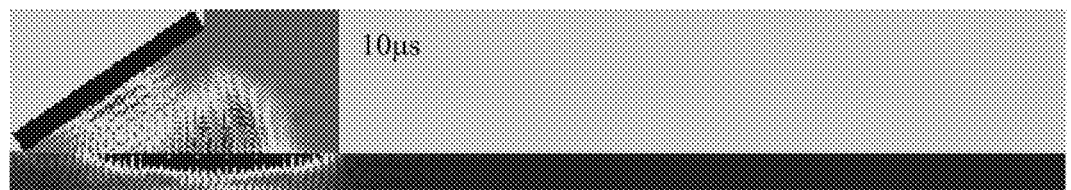
Figure 13:
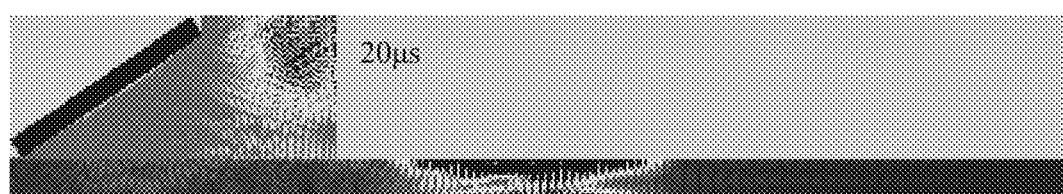
Figure 13:
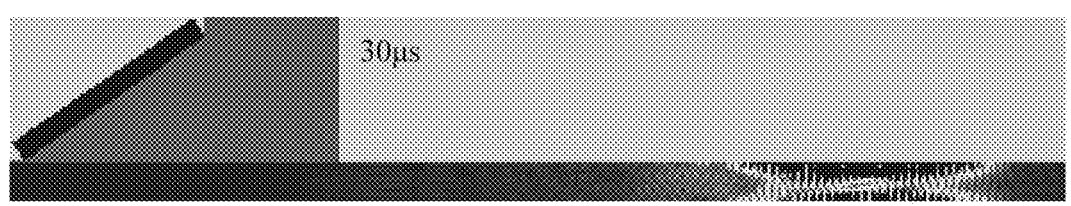
Figure 13:
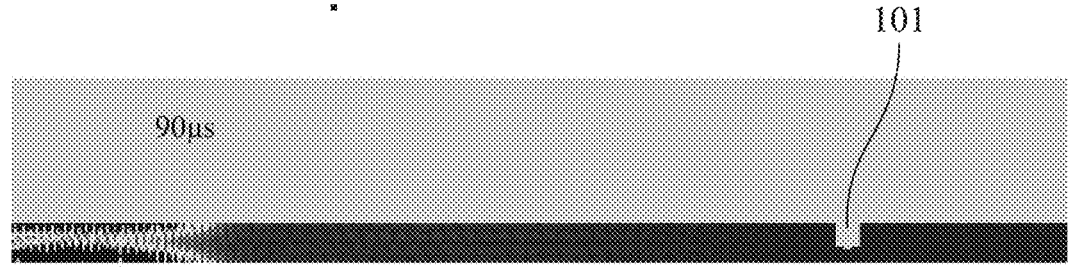
Figure 13:
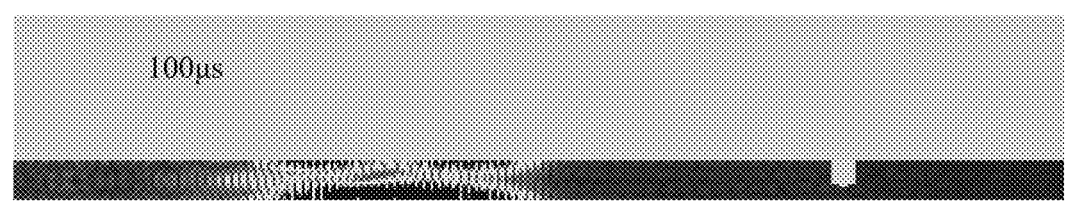
Figure 13:
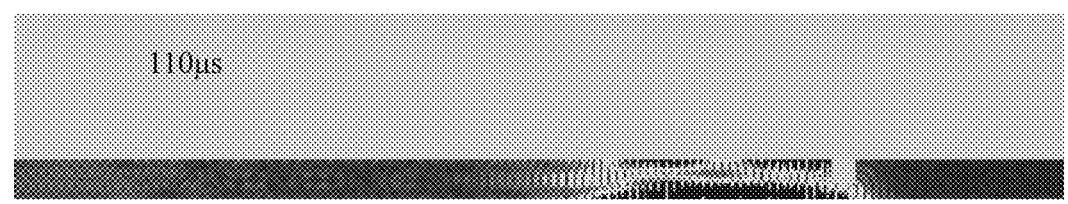

Causes of the occurrence of the characteristics shown in FIGS. 9 and 12 will be described with reference to FIGS. 13 to 16. FIG. 13 shows results of sound field simulation (a distance of 300 mm) obtained when the A0S0 mode is propagated at an angle of incidence of 34.5°. In FIG. 13, from 10 μs to 30 μs sound fields near the ultrasonic probe 1 are shown, and from 90 μs to 110 μs sound fields near the flaw 101 are shown. As shown in the drawing, immediately after incidence on the steel sheet 100 from the ultrasonic probe 1, energy of the plate wave is concentrated on the front side of the steel sheet 100. The energy distribution changes little by little with propagation, and when the plate wave reaches the flaw 101 present at a location with a distance of 300 mm, the energy of the plate wave is concentrated on the back side of the steel sheet 100.

Figure 14:
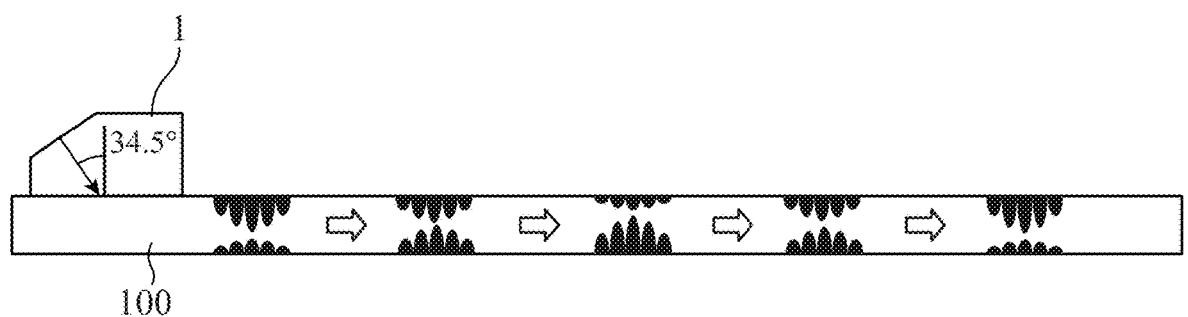
FIG. 14 is an illustrative diagram representing a transition of an energy distribution of the A0S0 mode in a simulated manner in the ultrasonic flaw detection device of the first embodiment of the invention.

FIG. 14 shows a simulated representation of a transition of the energy distribution of the A0S0 mode. As shown in the drawing, immediately after incidence on the steel sheet 100 from the ultrasonic probe 1, the energy of the plate wave becomes stronger on the front side of the steel sheet 100. After going through a state in which the energy distribution changes with propagation and the front and back sides have a comparable energy distribution, a state in which the energy becomes stronger on the back side is obtained. Thereafter, the plate wave propagates in such a manner that after going through a state in which the front and back sides have a comparable energy distribution again, the energy becomes stronger on the front side. Therefore, changes in echo height relative to the distance are reversed between a case where the flaw 101 is present on the front side of the steel sheet 100 and a case where the flaw 101 is present on the back side of the steel sheet 100. As a result, the A0S0 mode has the characteristics shown in FIGS. 9 and 12.

Figure 15:
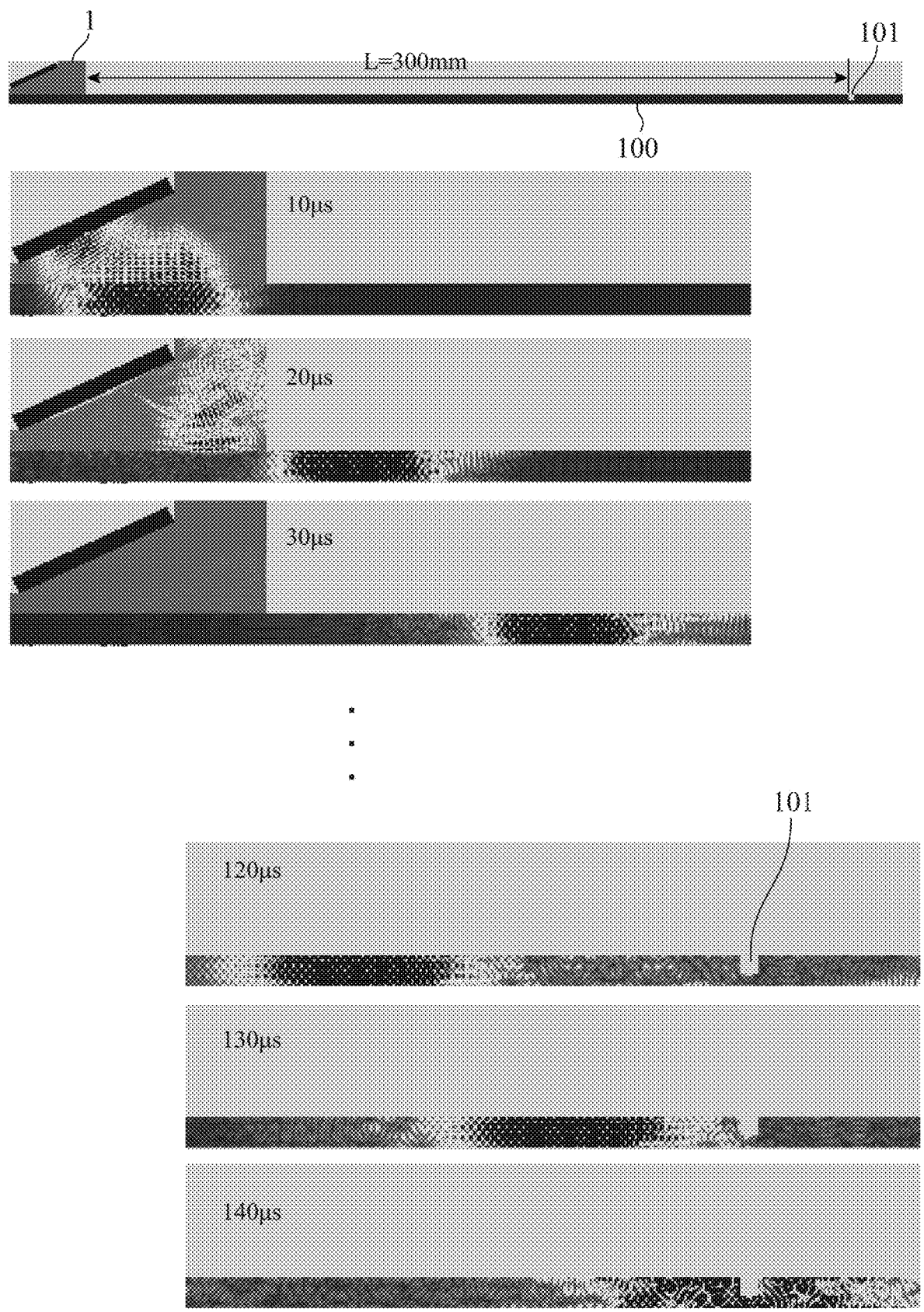
FIG. 15 is an illustrative diagram showing results of sound field simulation obtained when an S1 mode propagates at an angle of incidence of 24.6° in the ultrasonic flaw detection device of the first embodiment of the invention.

FIG. 15 shows results of sound field simulation (a distance of 300 mm) obtained when the S1 mode is propagated at an angle of incidence of 24.6°. In FIG. 15, from 10 μs to 30 μs sound fields near the ultrasonic probe 1 are shown, and from 120 μs to 140 μs sound fields near the flaw 101 are shown. As shown in the drawing, even immediately after incidence on the steel sheet 100 from the ultrasonic probe 1 and even when the plate wave reaches the flaw 101, a sound field distribution hardly changes, and is substantially uniform in a plate thickness direction.

Figure 16:
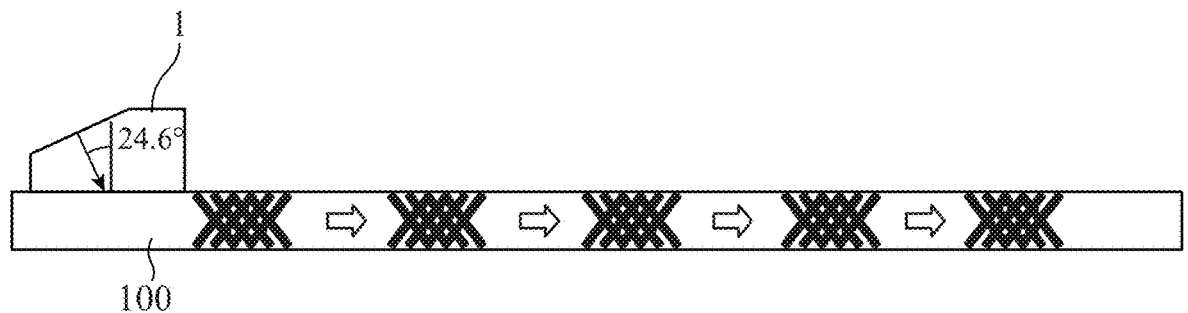
FIG. 16 is an illustrative diagram representing a transition of an energy distribution of the S1 mode in a simulated manner in the ultrasonic flaw detection device of the first embodiment of the invention.

FIG. 16 shows a simulated representation of a transition of an energy distribution of the S1 mode. As shown in the drawing, when the plate wave propagates, the energy distribution hardly changes. Since the energy distribution is substantially uniform in the plate thickness direction, changes in echo height relative to the distance are almost the same between in a case where the flaw 101 is present on the front side of the steel sheet 100 and in a case where the flaw 101 is present on the back side of the steel sheet 100. As a result, the S1 mode has the characteristics shown in FIGS. 9 and 12.

As described above, changes in echo height relative to the distance greatly differ between the A0S0 mode and the S1 mode. Using these characteristics, it is possible to determine on which one of the front and back sides of the steel sheet 100 the flaw 101 is present. Specific operation of the ultrasonic flaw detection device of the present embodiment will be described below.

Figure 17:
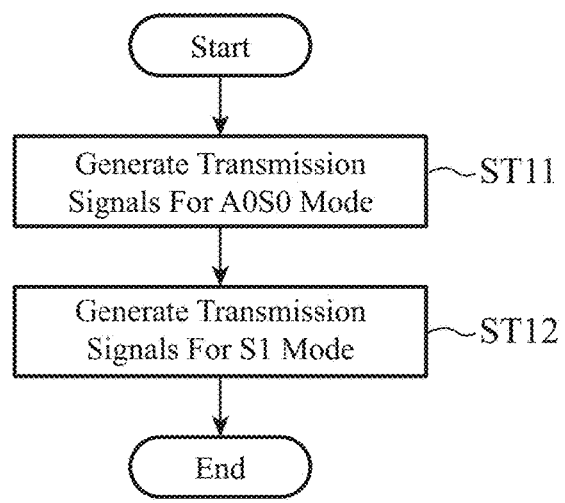
FIG. 17 is a flowchart showing the operation of a transmission signal processing unit in the ultrasonic flaw detection device of the first embodiment of the invention.
Figure 18:
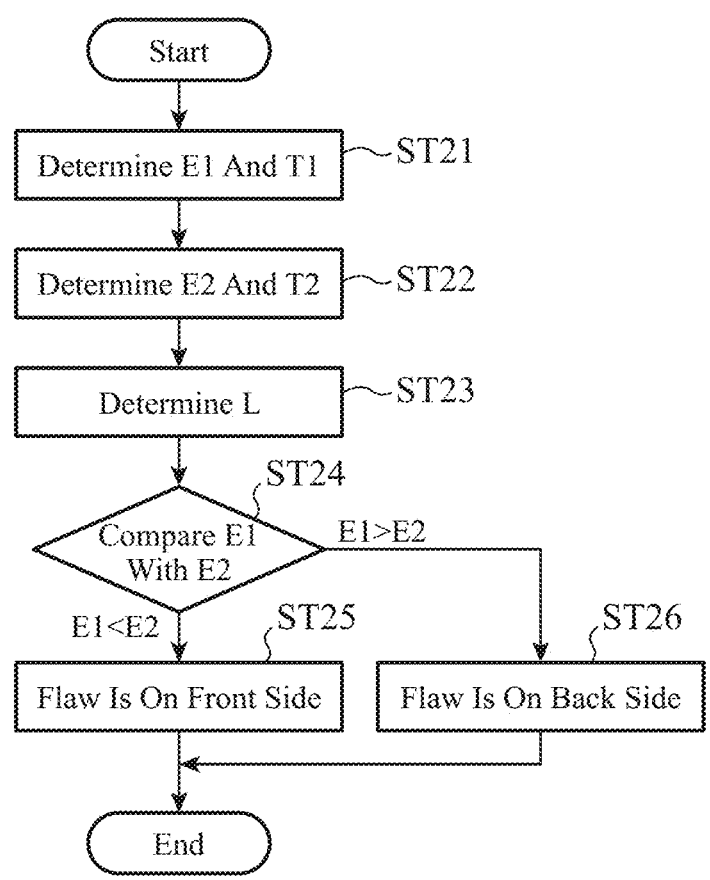
FIG. 18 is a flowchart showing the operation of a reception signal processing unit in the ultrasonic flaw detection device of the first embodiment of the invention.

FIG. 17 is a flowchart showing the operation of the transmission signal processing unit 3a, and FIG. 18 is a flowchart showing the operation of the reception signal processing unit 3b.

First, the transmission signal processing unit 3a transmits delay signals for the respective arrayed transducer elements of the transducer 1b to the transmitting unit 4 so as to obtain the angle of incidence at which the A0S0 mode propagates (step ST11). The transmitting unit 4 generates excitation signals using the delay signals transmitted from the transmission signal processing unit 3a, to excite the respective arrayed transducer elements of the transducer 1b in the ultrasonic probe 1. An example of FIG. 2 shows the state of propagation of ultrasound in the wedge 1a in a case in which a delay time assigned to the arrayed leftmost element of the transducer 1b is long and a delay time assigned to the rightmost element is short. Note that the angle of incidence at which the A0S0 mode propagates changes depending on the thickness of the steel sheet 100, the sound velocity of the wedge 1a, and the frequency, and thus is not limited to the angle)(34.5° shown in the simulation.

Thereafter, plate waves in A0S0 mode propagate through the steel sheet 100, and each of the arrayed transducer elements of the transducer 1b in the ultrasonic probe 1 receives, as an echo, the corresponding plate wave reflected by the flaw 101, converts the echo into an electrical signal, and transmits the electrical signal to the receiving unit 5. The receiving unit 5 amplifies the echo as necessary, and transmits the echo to the signal processing unit 3.

In the signal processing unit 3, the reception signal processing unit 3b assigns a delay time corresponding to each of the arrayed transducer elements of the transducer 1b to the corresponding echo, and combines the echo of each of the transducer elements. The amplitude of the echo is determined as E1 and the reception time of the echo is determined as T1, and the values of the E1 and T1 are stored in the RAM 303 or the storage 304 that is included in the reception signal processing unit 3b (step ST21). Namely, plate waves in A0S0 mode are allowed to propagate through the steel sheet 100 by controlling the angle of incidence and the angle at which reception is performed in a phased array system, by which the transmission and reception are performed.

After storing the values of E1 and T1 in the reception signal processing unit 3b, the angle of incidence is changed in the phased array system, to generate plate waves in S1 mode in the steel sheet 100. Namely, the transmission signal processing unit 3a transmits delay signals for the respective arrayed transducer elements of the transducer 1b to the transmitting unit 4 so as to obtain the angle of incidence at which the S1 mode propagates (step ST12). Note that the angle of incidence at which the S1 mode propagates changes depending on the thickness of the steel sheet 100, the sound velocity of the wedge 1a, and the frequency, and thus is not limited to the angle)(24.6° shown in the simulation.

Thereafter, plate waves in S1 mode propagate through the steel sheet 100, and each of the arrayed transducer elements of the transducer 1b in the ultrasonic probe 1 receives, as an echo, the corresponding plate wave reflected by the flaw 101, converts the echo into an electrical signal, and transmits the electrical signal to the receiving unit 5. The receiving unit 5 amplifies the echo as necessary, and transmits the echo to the signal processing unit 3.

In the signal processing unit 3, the reception signal processing unit 3b determines the amplitude E2 and reception time T2 of the echo in S1 mode in the phased array system, and stores the amplitude E2 and the reception time T2 in the RAM 303 or the storage 304 that is included in the reception signal processing unit 3b (step ST22).

As shown in FIG. 5, if the frequency is determined, then the group velocity of a plate wave is also determined. Namely, it is possible to estimate, from a reception time of an echo, a distance from the ultrasonic probe 1 to the flaw 101. For example, the group velocity of the A0S0 mode is substantially 3000 m/s regardless of the frequency, and thus, from T1×3000 m/s, a back-and-forth propagation distance of the A0S0 mode can be determined. The reception signal processing unit 3b determines a distance from the ultrasonic probe 1 to the flaw 101, and sets the distance as L (step ST23).

Changes in echo height relative to the distance as shown in FIGS. 9 and 12 are determined in advance by computation or experiment. The reception signal processing unit 3b compares the amplitude E1 of the A0S0 mode with the amplitude E2 of the S1 mode, and determines, from characteristics of the echo height relative to the distance, on which one of the front and back sides of the steel sheet 100 the flaw 101 is present (step ST24). For example, if the characteristics of the echo height relative to the distance are the same as those of FIGS. 9 and 12, then when the value of the distance L is 300 mm, the following relationships are evident:

E1<E2 The flaw 101 is present on the front side of the steel sheet 100 (step ST25)

E1>E2 The flaw 101 is present on the back side of the steel sheet 100 (step ST26).

The reception signal processing unit 3b displays the determination result on the display 307.

As such, by using the plate waves in the two modes, it is possible to determine on which one of the front and back sides of the steel sheet 100 the flaw 101 is present.

Note that although the above example describes the configuration and operation for transmitting and receiving the A0S0 mode and the S1 mode by the ultrasonic probe 1 in the phased array system, the ultrasonic probe 1 may send out ultrasound to the steel sheet 100 at a plurality of angles by mechanically scanning. For example, a plurality of angles may be obtained by using a type of variable angle probe as the ultrasonic probe 1. In addition, a plurality of angles may be obtained by using a plurality of angle probes having different angles of incidence. In addition, although the above example describes an ultrasonic flaw detection device that uses an angle probe, the angle probe does not need to be used as long as an ultrasonic probe that allows ultrasound to obliquely enter the steel sheet 100 is used.

As described above, an ultrasonic flaw detection device of the first embodiment includes: an ultrasonic probe that generates ultrasound waves corresponding to transmission signals to be provided thereto, and sends out the ultrasound waves into a specimen, and receives echoes of the respective ultrasound waves having propagated through the specimen, and outputs the received echoes as reception signals; a transmission signal processing unit that generates, as the transmission signals, signals that are used by the ultrasonic probe to send out the ultrasound waves to the specimen obliquely at a respective plurality of angles; and a reception signal processing unit that determines, from the reception signals, amplitudes of the echoes corresponding to the plurality of angles, and periods of time from when the respective ultrasound waves are sent out until the respective echoes are received, as reception times, and identifies a location of an acoustic discontinuous portion in the specimen from the reception times and a ratio between the amplitudes, and thus, there is an advantageous effect of being able to determine on which one of the front and back sides of the specimen a flaw is located.

In addition, according to the ultrasonic flaw detection device of the first embodiment, a transducer of the ultrasonic probe includes a plurality of arrayed transducer elements, and the transmission signal processing unit generates a set of signals having different delay times corresponding to the respective plurality of transducer elements, as a signal corresponding to each of the plurality of angles, and thus, a configuration for sending out ultrasound waves at the plurality of angles can be easily implemented.

In addition, according to the ultrasonic flaw detection device of the first embodiment, the ultrasonic probe sends out the ultrasound waves to the specimen obliquely at the respective plurality of angles by mechanically scanning, and thus, as the ultrasonic probe, various probes can be selected.

Note that in the invention of the present application, modification to any component of the embodiment or omission of any component of the embodiment is possible within the scope of the invention.

INDUSTRIAL APPLICABILITY

As described above, an ultrasonic flaw detection device according to the invention relates to a configuration in which plate waves in a plurality of different modes are allowed to propagate through a specimen using an ultrasonic probe, and the properties of the specimen are determined from the amplitude ratio and amounts of receive time of a plurality of received echoes, and is suitable for detecting a flaw, including determining on which one of the front and back of a steel sheet the flaw is present.

REFERENCE SIGNS LIST

1: Ultrasonic probe, 1a: Wedge, 1b: Transducer, 2: Transceiver, 3: Signal processing unit, 3a: Transmission signal processing unit, 3b: Reception signal processing unit, 4: Transmitting unit, 5: Receiving unit, 100: Steel sheet, 101: Flaw

The invention claimed is:

1. An ultrasonic flaw detection device comprising:
an ultrasonic probe to generate ultrasound waves corresponding to transmission signals to be provided to the ultrasonic probe and send out the ultrasound waves into a specimen, and receive echoes of the respective ultrasound waves having propagated through the specimen and output the received echoes as reception signals;
a processor to execute a program; and
a memory to store the program, when executed by the processor, perform processes of,
generating, as the transmission signals, signals that are used by the ultrasonic probe to send out the ultrasound waves to the specimen obliquely at a respective plurality of angles; and
determining, from the reception signals, amplitudes of the echoes corresponding to the plurality of angles, and periods of time from when the respective ultrasound waves are sent out until the respective echoes are received, as reception times, and identifying a location of an acoustic discontinuous portion in the specimen from the reception times and a ratio between the amplitudes of the echoes corresponding to the plurality of angles,
wherein the identified location indicates that the acoustic discontinuous portion is on one of a front-side and a back-side of the specimen.

2. The ultrasonic flaw detection device according to claim 1, wherein
a transducer of the ultrasonic probe includes a plurality of arrayed transducer elements, and
the processes include generating a set of signals having different delay times corresponding to the respective plurality of transducer elements, as a signal corresponding to each of the plurality of angles.

3. The ultrasonic flaw detection device according to claim 1, wherein the ultrasonic probe sends out the ultrasound waves to the specimen obliquely at the respective plurality of angles by mechanically scanning.

4. The ultrasonic flaw detection device according to claim 1, wherein the processor
estimates a distance from the probe to the acoustic discontinuous portion from the reception times, and
determines on which of the front-side and the back-side of the specimen the acoustic discontinuous portion is located using differences between changes in echo height relative to the distance between an A0S0 mode and an S1 mode of the ultrasound waves.

* * * * *